Feb. 14, 1956

L. SCHMIEDEL 2,734,681

CENTRIFUGAL SEPARATOR

Filed April 24, 1951

Inventor:
Ludwig Schmiedel
by Watson, Cole
Grindle & Watson
Attorneys

United States Patent Office 2,734,681
Patented Feb. 14, 1956

2,734,681
CENTRIFUGAL SEPARATOR

Ludwig Schmiedel, Leipzig, Germany, assignor to Starcosa Maschinen- und Apparatebau Gesellschaft mit beschrankter Haftung, a company of Germany Application April 24, 1951, Serial No. 222,595

Claims priority, application Germany May 2, 1950

9 Claims. (Cl. 233—7)

My invention relates to a centrifugal separator and more particularly to a separator of that type provided with a tapering drum mounted to rotate about a substantially horizontal axis and serving to separate a mixture of solid matter and a liquid.

In a separator of that type, the solid matter will deposit on the internal wall of the drum and will be scraped off and discharged by a feeding worm.

Such separators serve the purpose of obtaining solids suspended in a liquid. In cases, however, where the solid matter comprises more than a single constituent representing a mixture of components considerably differing from each other, one component being possibly an impurity of another primary component, the additional problem arises to cleanly separate various constituents of the solid matter constituting the mixture deposited. More particularly, such separation should be carried out in a manner whereby the primary constituent will be obtained separately from the impurity thereof. For the purpose of solving that problem very complicated and tedious methods have been developed requiring the use of extensive apparatus and many of such methods are open to the objection that the solids to be obtained will be adversely affected by chemical or other influences, for instance by a reaction of the constituents with one another.

In nearly all such cases the various solid constituents differ by their specific weight, or by the size or shape of their particles. Consequently, such particles, when suspended in a liquid, will have different settling speeds. I make use of that fact for separating the various solids using a current of liquid flowing in a predetermined direction. In such current the different solids will sink at different speeds, the solids having a high sinking speed settling after a comparatively short travel, whereas the solids having a lower sinking speed will settle after traveling a longer distance.

Thus, the present invention affords a possibility of separating the primary constituent of a mixture of solids from secondary constituents constituting impurities, such solid impurities being carried away together with the liquid. In the description of my invention following hereinafter a primary constituent to be produced in pure condition will be termed "heavier solid," whereas the other constituents being undesirable admixtures will be called "light constituents."

According to my novel invention the horizontal centrifugal separator will be equipped with a drum, the cross section of which increases from the end where it is charged with liquid to be treated towards a plane intermediate its ends, such drum being provided with a discharge worm. Whereas all prior separators of that kind were so designed as to decelerate the flow of liquid towards the discharge end of the drum, I endeavor to accelerate such flow beyond the plane of the largest cross section of the drum to thereby increase the speed of the passage of the liquid through the drum. The means of attaining such increase of the speed of flow is a gradual reduction of the cross section of the drum between said plane and the discharge end of the drum where the liquid is discharged therefrom. The effect so attained may be enhanced by a reduction of the level of the annular weir provided at such discharge end of the drum.

As the cross section of the drum decreases towards the discharge end of the drum, the width of the discharge worm will likewise decrease in order to prevent the light solids from settling within the comparatively calm regions located between the worm helices.

Preferably, the radial height of the weir is rendered variable in order to properly control the flow speed of the liquid through the drum. To this end, the annular member constituting the weir may be mounted to be readily exchangeable.

In an embodiment of my invention which has been found satisfactory for many uses, the discharge end of the tapering drum having a continuously tapering cross section is provided with an internal cylindrical face within a zone located adjacent to the discharge end. The width of that zone depends on the requirements of any particular case, the cylindrical internal face functioning at the same time as the weir, the orthodox weir of prior designs being eliminated. A separation of the solids may be enhanced by providing means for feeding the solids settling just in front of the weir by the feed worm towards the discharge end and discharging the solids therethrough.

My invention has proved to be particularly applicable to the production of starch from potatoes for instance. The embodiments described hereinafter, therefore, constitute centrifugal separators primarily designed for use in starch factories.

In the drawings

Prior to my invention it was customary in the production of starch to separate the solid matter in a centrifugal separator in a first operation and to classify the solid matter in settling troughs in a second operation. My novel centrifugal separators described hereinafter are adapted to carry out both in a single operation.

Figure 1:
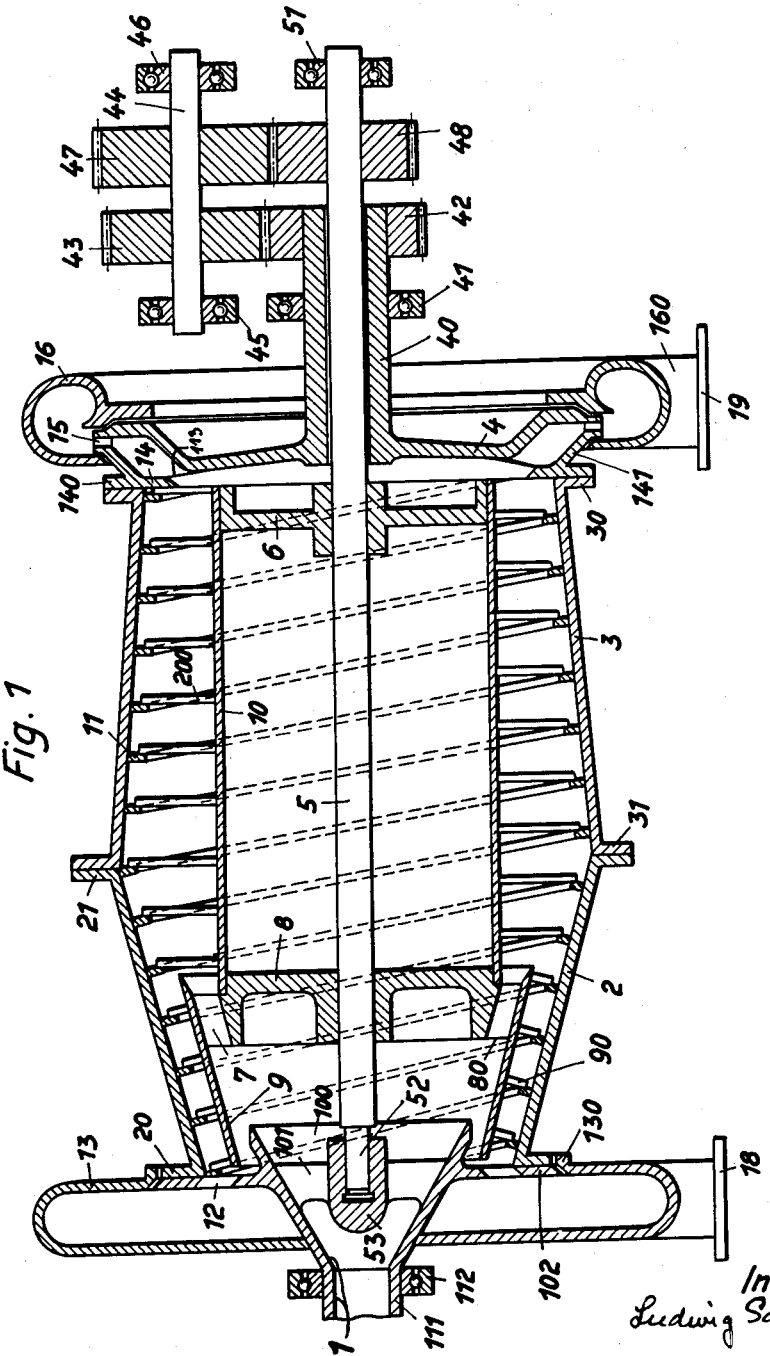
Fig. 1 is a longitudinal section through a centrifugal separator according to the invention.

The centrifugal separator illustrated in Fig. 1 includes a shaft 5 driven from a suitable source of power not shown, one end of such shaft being journalled by means of a ball bearing 51 in a suitable stationary support not shown, whereas the other reduced end 52 of the shaft 5 extends into and is firmly fastened to a head 53. The separator drum to be described hereinafter has an end wall 102 provided with a central aperture. The central aperture is surrounded by a conical casting 1, 100 which is integral with the end wall 102, radial ribs 101 inside of said aperture and the head 53 axially located within the casting. A tubular extension 111 of the casting 1, 100 co-axially arranged with respect to the head 53 is journalled by means of an anti-friction bearing 112 in a suitable stationary support not shown.

The end wall 102 is provided with a plurality of discharge openings 12 through which the feed worm to be described hereinafter discharges the solid matter separated from the liquid fed into the drum through the central aperture.

Means are provided for collecting the solids issuing from the discharge openings 12, such means comprising, in the present embodiment, a hollow casting 13 which surrounds the casting 1 having two parallel end walls provided with co-axial openings, the opening of one end wall having a rim 130, while the opening of the other end wall accommodates the casting 1 suitably sealed thereagainst by sealing means not shown. The rim 130 surrounds the periphery of the end wall 102, same being so fitted therein as to freely rotatable. Preferably, the casting 13 is divided along a horizontal plane in two sections which are firmly connected by screws not shown.

The end wall 102 of the casting 1 is rigidly connected with a flange 20 of the rotary separator drum 2, 3. As will appear from the drawing, the drum is so shaped as to taper from a transverse plane intermediate its ends towards its ends. Preferably, the drum is composed of two adjoining sections 2 and 3 which taper towards the ends of the drum, the smallest diameter of the section 3 at the right hand end thereof viewed in Fig. 1 being in excess of the smallest diameter of section 2 at the left hand end thereof. Thus, it will appear that the drum sections 2 and 3 have a frustro-conical shape being rigidly connected to one another by flanges 21 and 31 and suitable screws not shown. The tapering end of the drum section 3 is provided with a peripheral flange 30 to which a flange 140 of a casting 4 is bolted, such casting constituting the other end wall of the drum. The casting 4 is integral with an axial hub 40 freely surrounding shaft 5 and being journalled by an anti-friction bearing 41 in a suitable stationary support not shown. Thus, the two anti-friction bearings 112 and 41 will support the drum for rotation about its axis.

The end wall 4 is provided with a plurality of discharge openings 113 near its periphery, each of such openings communicating with ducts extending axially and outwardly and terminating in an outlet provided in a circular rim 15 formed by the casting 4.

Adjacent to the end wall 4 a collector 16 is mounted serving the function of collecting and discharging the liquid passing through the openings 113. The collector 16 is formed by an annular hollow casting having an inner peripheral slot which straddles the rim 15 at as close a spacing as consistent with the free rotatability of the drum. Preferably, the casting 16 is divided along a horizontal plane in two sections suitably connected to one another by screws not shown. The lower section is integral with a discharge tube 160 provided with a flange 19 attached to a suitable discharge pipe not shown.

Driving means are co-operatively connected with the shaft 5 and with the drum through the intermediary of the hub 40 and adapted to produce a relative rotation between the drum and the shaft 5. In the present embodiment such driving means comprise a gear 42 attached to the hub 40, a gear 48 attached to the shaft 5, and two gears 43 and 47 which are attached to a shaft 44 extending parallel to shaft 5 and journalled in stationary supports not shown by means of anti-friction bearings 45 and 46, the two gears 43 and 47 meshing with the gears 42 and 48, respectively. As shown in Fig. 1, gear 48 has a slightly smaller diameter than gear 42. Therefore, the operation of shaft 5 at a certain speed from a suitable source of power mentioned above results in the rotation of the hub 40 and of the drum carried thereby in the same direction but at a slightly different speed.

The shaft 5 constitutes mounting means for a feeding worm 11 mounting same for relative rotation within the drum 2, 3 substantially in contact with the inside of the drum sections. The worm 11 is preferably constituted by a helical strip which is rigidly connected by suitable holding members 200 with a tubular member 10 which, in its turn, is rigidly connected with the shaft 5 by disks 6 and 8 connected thereto. The holding members 200 may be formed by axial and peripherally spaced rods which permit of a ready axial flow of liquid within the drum. Separate supporting means are provided in the present embodiment for the left hand end of the worm 11. For this purpose, the disk 8 attached to shaft 5 has radial outwardly projecting ribs 7 carrying a conical sheet metal member 9 to which the worm is rigidly connected by holding members 90 in form of pins. The hand of the helical strip constituting the worm 11 is so chosen with respect to the driving means 42, 43, 47, and 48 that the worm feeds the solids deposited on the internal face of the drum towards the left through the openings 12 into the casting 13.

The flange 140 of the casting 4 extends inwardly beyond the flange 30 of the drum section 3 to constitute an annular weir 14 determining the substantially cylindrical internal level of the annular body of liquid forming in the drum 2, 3 when the same revolves at a high speed. It will be noted from Fig. 1 that both drum sections 2 and 3 constitute a peripheral drum wall free from any perforations.

The operation of my novel centrifugal separator is as follows:

The material to be treated is fed through the casting 1 into the conical sheet metal member 9 and passes therefrom through the passages 80 provided between the ribs 7 into the drum section 2 at a point intermediate the ends thereof. The liquid so fed will be accelerated in circumferential direction while passing to the plane of the joint between the drum sections 2 and 3 at a gradually decreasing speed. As the liquid passes through the drum section 3 towards the right, its peripheral speed will decrease, whereas its axial speed component will increase until the liquid reaches the weir 14. By suitably dimensioning the diameter of the weir and the shape of the drum sections 2 and 3 in relation to the quantity of the liquid supplied, the speed of flow will be so controlled and increased, as the liquid approaches the weir 14, that the heavy solids will settle on the wall of the drum section 3, while the lighter solids will be carried away by the liquid across the weir 14. The heavy solids deposited on the internal wall of the drum are scraped off by the feed worm 11 and are fed to the left being ultimately discharged through the openings 12 provided in the end wall 102. There the solids are collected by casting 13 and discharged through suitable tubes not shown.

Figure 2:
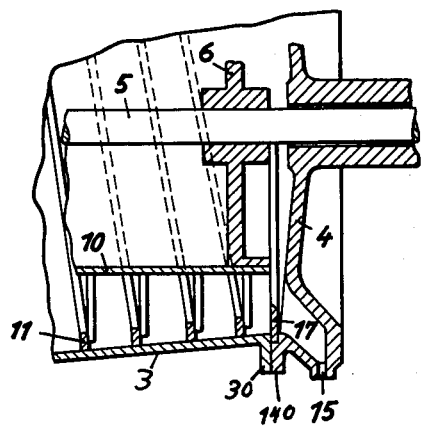
Fig. 2 is a partial sectional illustration of a modified discharge end of the drum provided with an exchangeable weir.

Fig. 2 illustrates a modified form of the weir, same being constituted by an exchangeable annular member 17 interposed between the flanges 30 and 140. By electing an annular member 17 of appropriate diameter and by inserting same, the internal level of the annular body of liquid forming in the drum may be so determined as to result in the desired axial component of the speed of flow of the liquid through the drum.

It will be readily appreciated that the width of the helical strip constituting the worm 11 influences the axial component of the speed of flow, a free flow being possible between the internal diameter of such strip only and between the internal level of the annular liquid body. In the space between the helices of the worm the liquid has no substantial component of flow in axial direction. Therefore, light solids are liable to settle at such points since they are no longer carried away by the current. Under adverse circumstances the result might be an insufficient solution of the problems discussed supra, the impurities not being removed to the extent required.

Figure 3:
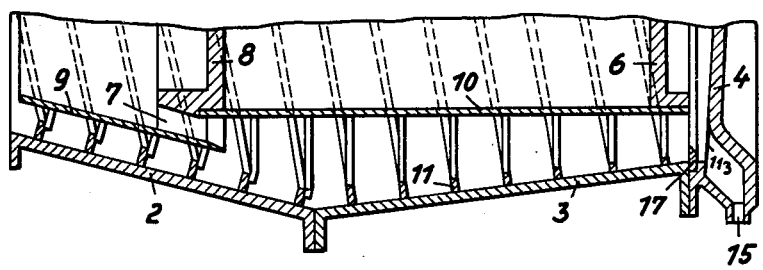
Fig. 3 is a partial sectional view of still another embodiment showing a modified feeding worm.

Therefore, I prefer under certain conditions to use the embodiment illustrated in Fig. 3 in which the width or radial dimension of the helical strip tapers towards the discharge openings 113. As a result, the proportion of the cross section available to the axial flow component in relation to the entire cross section between the internal face of the drum section 3 and the internal level of the liquid will be increased towards the discharge openings 113, the layer of liquid entrapped between the helices of the worm being gradually reduced at the same time. Consequently, the lighter solids will not be permitted to settle but will be carried away by the supporting liquid. As in this embodiment the settling path of the particles will be the shorter the higher the axial component of the flow will be, the heavy particles will nevertheless settle on the internal face of the drum section 3, particularly inasmuch as but a small quantity of heavy particles will be suspended in the liquid near the discharge end provided with the openings 113. In this embodiment the height of the weir may be made particularly low.

Figure 4:
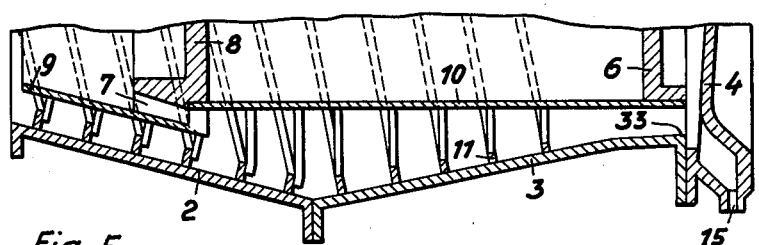
Fig. 4 is a partial longitudinal section of a centrifugal separator in which the end of the drum functions as the weir.

In certain materials a larger proportion of comparatively small particles may result in a reduction of the quality of the primary component sought. Fig. 4 illustrates an embodiment in which the helical strip constituting the worm 11 does not extend up to the end of drum section 3 but terminates at some distance therefrom. Moreover, drum section 3 is so shaped that the rim 33 at the end thereof constitutes the weir. As a result, so large a flow speed will be attained near the end of the drum that, in addition to the light particles, heavier particles will be carried away by the liquid.

Figure 5:
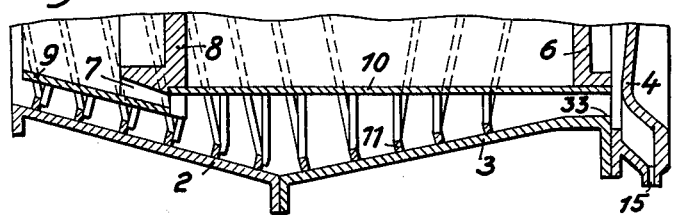
Fig. 5 shows a partial longitudinal section of a separator similar to that shown in Fig. 4, some of the helices of the feed worm near the discharge end of the drum having a hand opposite to that of the rest of the worm.

If desired, a larger proportion of the relatively small particles may be separated in a machine of the design illustrated in Fig. 5 in which a number of helices near the discharge end of drum section 3 may have a hand opposite to that of the rest of the worm so that the solid matter settling within the range of such helices will be fed to the discharge end 33 and will be carried away by the liquid.

Moreover, the drum section 3 may be so shaped as to form an internal cylindrical face within a region located adjacent to the rim 33.

While I have described my invention by reference to a number of preferred embodiments thereof, I wish it to be clearly understood that the same is not limited to the details of such embodiments, but is capable of numerous modifications within the scope of the appended claims.

What I claim is:

1. A centrifugal separator comprising a horizontally disposed rotary drum tapering from a transverse plane intermediate its ends towards its ends, the peripheral wall of said drum being free from perforations, means mounted adjacent to one end of said drum to feed the liquid to be treated into the latter, a collector mounted adjacent to the other end of said drum and adapted to collect and discharge the liquid issuing from such end, a discharging worm of helical strip form mounted for relative rotation within said drum substantially in contact with the inside of said peripheral wall and adapted to feed axially the deposits separated from said liquid out of at least one end of said drum, means co-ordinated to said last mentioned end of said drum and adapted to collect the solids discharged therefrom by said worm, and means for rotating said drum and said worm about a horizontal axis.

2. A centrifugal separator comprising a horizontally disposed rotary drum composed of two adjoining sections tapering towards the ends of the drum and being free from perforations, end walls mounted on said drum for common rotation therewith, said end walls being provided with discharge openings for the discharge of material from said drum, one of said end walls having an aperture for charging said drum with liquid to be treated, a discharging worm of helical strip form mounted for relative rotation within said drum substantially in contact with the inside of said drum sections and adapted to feed axially the deposits separated from said liquid towards at least one of said end walls and through said discharge openings therein, collecting means co-ordinated to at least one of said end walls and adapted to collect the solids issuing from said discharge openings, a collector mounted adjacent to the other one of said end walls and adapted to collect and discharge the liquid passing through the openings provided therein, and means for rotating said drum and said worm about a horizontal axis.

3. A centrifugal separator comprising a horizontally disposed rotary drum having a peripheral wall free from perforations, means mounted adjacent to one end of said drum to feed the liquid to be treated into the latter, means mounted on the other end of said drum constituting an annular weir adapted to determine the substantially cylindrical internal level of the annular body of liquid forming in said drum when the same revolves at a high speed, a discharging worm of helical strip form mounted for relative rotation within said drum substantially in contact with the inside of said peripheral wall and adapted to feed axially the deposits separated from said liquid out of said drum, means co-ordinated to at least one end of said drum and adapted to collect the solids fed out of said drum by said worm, the internal diameter of said drum being smaller near the ends thereof than intermediate said ends, a collector mounted adjacent to said weir and adapted to collect and discharge the liquid passing thereover, and means for rotating said drum and said worm about a horizontal axis.

4. A centrifugal separator comprising a horizontally disposed rotary drum composed of two adjoining sections tapering towards the ends of the drum and being free from perforations, end walls mounted on said drum for common rotation therewith, said end walls being provided with discharge openings for the discharge of material from said drum, one of said end walls having an aperture for charging said drum with liquid to be treated, an annular weir co-ordinated to the other one of said end walls and adapted to determine the substantially cylindrical internal level of the annular body of liquid forming in said drum when the same revolves at a high speed, a discharging worm of helical strip form mounted for relative rotation within said drum substantially in contact with the inside of said drum sections and adapted to feed axially the deposits separated from said liquid towards at least one of said end walls and through said discharge openings therein, means co-ordinated to at least one of said end walls and adapted to collect the solids issuing from said discharge openings, a collector mounted adjacent to the other one of said end walls and adapted to collect and discharge the liquid passing through the openings provided therein, and means for rotating said drum and said worm about a horizontal axis.

5. The combination set forth in claim 4 in which said weir co-ordinated to the other one of said end walls and adapted to determine the substantially cylindrical internal level of the annular body of liquid forming in said drum when the same revolves at a high speed is constituted by an internal flange of said last mentioned end wall, the latter being formed with a hub, a rotary shaft being provided freely extending through said hub and carrying said worm.

6. A centrifugal separator comprising a horizontally disposed rotary drum tapering from a transverse plane intermediate its ends towards its ends, the peripheral wall of said drum being free from perforations, end walls mounted on said drum for common rotation therewith and provided with discharge openings, one of said end walls having an aperture for charging said drum with liquid to be treated, a discharging worm constituted by a helical strip, a tubular member, mounting means for mounting said tubular member co-axially within said drum for relative rotation thereto, spaced holding members constituting a rigid connection between said tubular member and said helical strip and adapted to hold the latter substantially in contact with the internal surface of said rotary drum, said holders being arranged and shaped to permit of an axial flow of liquid within said drum, means co-ordinated to at least one of said end walls and adapted to collect the solids fed from said discharge openings by said worm, a collector mounted adjacent to the other one of said end walls and adapted to collect and discharge the liquid passing through the openings provided therein, and means for rotating said drum and said worm about a horizontal axis, said last means being co-operatively connected with said mounting means and with said drum to produce a relative rotation therebetween.

7. The combination claimed in claim 6 in which the width of said helical strip tapers from the greatest diameter of the drum towards the end of the drum where liquids are discharged.

8. The combination set forth in claim 2 in which the internal face of one of said two adjoining drum sections which tapers towards said other one of said end walls terminates in a substantially cylindrical zone adjacent to said collecting means.

9. The combination set forth in claim 2 in which said rotary drum has an internal cylindrical face within a zone adjacent to said other one of said end walls and is continuously tapering from a plane located intermediate its ends towards said zone and towards said one of said end walls.

References Cited in the file of this patent

UNITED STATES PATENTS

| | | |
|---|---|---|
| 775,320 | Van Kirk | Nov. 22, 1904 |
| 924,376 | Phillips | June 8, 1909 |
| 2,458,706 | Howe | Jan. 11, 1949 |
| 2,528,974 | Ritsch | Nov. 7, 1950 |
| 2,600,372 | Milliken | June 10, 1952 |

FOREIGN PATENTS

| | | |
|---|---|---|
| 539,140 | Great Britain | Aug. 28, 1941 |
| 653,056 | Germany | Nov. 13, 1937 |